(12) United States Patent
Yoshino et al.

(10) Patent No.: US 11,712,769 B2
(45) Date of Patent: Aug. 1, 2023

(54) COLLECTING MECHANISM AND COLLECTING METHOD FOR COLLECTING MACHINED PORTION

(71) Applicant: OKUMA Corporation, Aichi (JP)

(72) Inventors: Kiyoshi Yoshino, Aichi (JP); Yosuke Ichigi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 560 days.

(21) Appl. No.: 16/561,665

(22) Filed: Sep. 5, 2019

(65) Prior Publication Data
US 2020/0078887 A1    Mar. 12, 2020

(30) Foreign Application Priority Data

Sep. 6, 2018  (JP) ................... 2018-167090

(51) Int. Cl.
*B23Q 1/44*  (2006.01)
*B23B 5/14*  (2006.01)
(Continued)

(52) U.S. Cl.
CPC ............. *B23Q 1/44* (2013.01); *B23B 5/14* (2013.01); *B23Q 1/76* (2013.01); *B23Q 17/0961* (2013.01); *B25J 15/0019* (2013.01)

(58) Field of Classification Search
CPC ............ B23B 5/14; B23B 5/12; B23B 25/06; B23Q 1/44; B23Q 1/76; B23Q 1/25;
(Continued)

(56) References Cited

U.S. PATENT DOCUMENTS

| 4,949,444 A | 8/1990 | Kojima et al. |
| 5,115,599 A * | 5/1992 | Stolzer ................ B23D 47/042 |
| | | 414/745.7 |
| 5,168,609 A * | 12/1992 | Kojima ................... B23B 3/06 |
| | | 29/27 R |

(Continued)

FOREIGN PATENT DOCUMENTS

| JP | S4950880 U | 5/1975 |
| JP | S52016071 A | 2/1977 |

(Continued)

OTHER PUBLICATIONS

JPO Notice of Reasons for Refusal for corresponding JP Application No. 2018-167090, dated Jun. 14, 2022.

*Primary Examiner* — Tyrone V Hall, Jr.
*Assistant Examiner* — Makena S Markman
(74) *Attorney, Agent, or Firm* — Cantor Colburn LLP

(57) ABSTRACT

The collecting mechanism includes a holding unit and a controller. The holding unit has a pair of arms, and can sandwich a machined portion with the pair of arms. The holding unit can be switched between a holding state and a standby state. In the holding state, the pair of arms is closed to be in contact with the circumferential surface of the machined portion to sandwich the machined portion. In the standby state, the pair of arms is opened so as to stay near the circumferential surface of the machined portion with a space between the arms and the circumferential surface of the machined portion. The controller monitors whether cutting-off of the machined portion has been completed to keep the holding unit in the standby state before completion of the cutting-off and to switch the holding unit from the standby state to the holding state at the time of completion of the cutting-off.

8 Claims, 7 Drawing Sheets

(51) Int. Cl.
*B25J 15/00* (2006.01)
*B23Q 17/09* (2006.01)
*B23Q 1/76* (2006.01)

(58) Field of Classification Search
CPC ...... B23Q 1/706; B23Q 7/047; B23Q 17/096; B23Q 7/008; B23Q 7/04; B23Q 7/041; B23Q 7/043; B23Q 7/046; B25J 15/0019; B25J 15/0033; B25J 15/0038; B25Q 3/101
USPC .......................... 82/46, 47, 48, 52, 30, 162
See application file for complete search history.

(56) References Cited

U.S. PATENT DOCUMENTS

| | | | | |
|---|---|---|---|---|
| 5,401,230 | A * | 3/1995 | Momoi | B23D 47/042 |
| | | | | 82/127 |
| 9,533,355 | B2 * | 1/2017 | Esser | B23Q 3/183 |
| 10,065,324 | B2 * | 9/2018 | Nakamura | B23Q 7/1405 |
| 10,786,887 | B2 * | 9/2020 | Isusi | B25B 5/147 |
| 2002/0189063 | A1 * | 12/2002 | Prust | B23Q 1/76 |
| | | | | 29/27 R |
| 2004/0060402 | A1 | 4/2004 | Shimada et al. | |
| 2012/0097411 | A1 * | 4/2012 | Yoshino | B23Q 17/10 |
| | | | | 702/145 |

FOREIGN PATENT DOCUMENTS

| | | |
|---|---|---|
| JP | H01103202 A | 4/1989 |
| JP | 2002233986 A | 8/2002 |
| JP | 2004114226 A | 4/2004 |

* cited by examiner

COLLECTING MECHANISM AND COLLECTING METHOD FOR COLLECTING MACHINED PORTION

CROSS REFERENCE TO RELATED APPLICATION

This application claims priority to Japanese Patent Application No. 2018-167090 filed on Sep. 6, 2018, which is incorporated herein by reference in its entirety including the specification, claims, drawings, and abstract.

TECHNICAL FIELD

This specification discloses a collecting mechanism and a collecting method for collecting machined portions to be cut off from a material in turning machining.

BACKGROUND

Traditionally, cutting machining (parting machining) for cutting off machined portions from a material through turning machining has been known. In cutting machining, a rotatably held material is rotated, with a tool pressed onto the material, to thereby cut off a portion of a material, or a machined portion.

Here, while the material is normally rotatably held by a spindle, a portion (a machined portion) cut off from the material will drop due to gravity upon completion of cutting machining. The dropped machined portion may crash against the machine tool to be thereby dented or otherwise damaged.

To address the above, traditionally, a technique for collecting machined portions while preventing damage to the cut off machined portions has been suggested. For example, Patent Documents 1 and 2 disclose a holding mechanism that holds, by sandwiching, a machined portion with a pair of prongs to collect. As each prong has a bearing on its inside surface, the bearing being able to tolerate the rotation of the material, it is possible to hold a machined portion by sandwiching the machined portion with the pair of prongs even during cutting machining. With this structure, damage to a cut off machined portion due to drop of the machined portion can be effectively prevented, so that the quality of the machined portions can be improved to some extent.

CITATION LIST

Patent Literature

PATENT DOCUMENT 1: JP 54950880 U
PATENT DOCUMENT 2: JP 2002-233986 A

A typical holding mechanism, however, suffers from lower accuracy in positioning, as compared with a machine tool. Hence, a mismatch in position between the rotation center of the material and the position of the holding mechanism can result, which in some cases leads to slight deflection of the material when the material is sandwiched with the holding mechanism. If the material is rotated while being deflected, as described above, the material may vibrate, which can impair the quality of a cut section of the machined portion.

To address the above, this specification discloses a collecting mechanism and a collecting method for improving the quality of a machined portion to be cut off from a material through cutting machining.

SUMMARY

According to one aspect of this disclosure, there is provided a collecting mechanism for collecting a machined portion to be cut off from a material through turning machining, the collecting mechanism including: a holding unit having a pair of arms, the holding unit being for sandwiching the machined portion with the pair of arms, the holding unit being switchable between a holding state in which the pair of arms is closed so as to be in contact with a circumferential surface of the machined portion to thereby sandwich the machined portion, and a standby state in which the pair of arms is open so as to stay near the circumferential surface of the machined portion with a space between the pair of arms and the circumferential surface of the machined portion; and a controller for controlling driving of the holding unit, wherein the controller monitors whether cutting-off of the machined portion has been completed to keep the holding unit in the standby state before completion of the cutting-off, and to switch the holding unit from the standby state to the holding state at the time of completion of the cutting-off.

As this structure keeps the holding unit spaced apart from the material during cutting machining, the holding unit does not apply an extra force to the material. Consequently, this makes it possible to prevent deflection and vibration of the material, so that the quality of the cut sections of machined portions can be improved. Upon completion of cutting machining, the machined portion is sandwiched with the holding unit. This makes it possible to effectively prevent damage to the machined portion due to drop of the machined portion.

In one embodiment, each of the arms in the pair may include a main arm body, and one or more rollers mounted on the main arm body, the roller being rollable on the circumferential surface of the machined portion.

Provision of a roller enables prevention of rubbing between the arms and the machined portion, which remains rotating due to inertia after being cut off. This can further improve the quality of the machined portion.

In one embodiment, the holding unit may have an opening/closing actuator for linearly advancing and retreating the pair of arms in the width direction of the holding unit, and each of the arms in the pair may have two of the rollers linearly disposed on the arm in the height direction of the holding unit.

With this structure, the machined portion is sandwiched with four rollers in total such that the center of the machined portion matches the center of the circumcircle of the four rollers. With this structure, as the position of the center of the circumcircle relative to the reference point at the root of the holding unit remains constant regardless of the diameter of the machined portion (regardless of the amount of opening of the arms), simple control of the position of the holding unit is achieved.

In one embodiment, at least a surface of the main arm body, the surface being opposed to another main arm body, is curved or bent so as to convex in a direction departing from the other main arm body.

This structure can prevent interference between the main arm body and the machined portion.

Further, the collecting mechanism may further include a cutting determination sensor for measuring a physical quantity that depends on at least one of the rotation resistance of a spindle that rotatably holds the material and a cutting resistance in cutting the material, and the controller may determine the time of completion of the cutting-off of the machined portion, based on the measured value of the cutting determination sensor.

This structure enables accurate determination of the time of completion of cutting.

In one embodiment, the cutting determination sensor may include a sensor that measures any of the torque of the rotation motor of the spindle, the current of the rotation motor, the torque of a moving motor of a tool post that holds the tool, the current of the moving motor, and the distortion of the tool, and the controller may determine as the time of completion of the cutting-off of the machined portion a time at which the differential value of the measured value of the cutting determination sensor becomes equal to or less than a threshold that is a predetermined negative value.

This structure enables more accurate determination of the time of completion of the cutting-off.

Further, the collecting mechanism may further include a multiple-degree-of-freedom robot installed inside the machine chamber, and the holding unit may be attached as an end effector to the robot.

This structure enables increasing the degree of freedom for the holding unit to move, as well as improvement in the versatility of the collecting mechanism.

In one embodiment, the controller may control the holding unit such that the holding unit collects a residual material that is a material left behind after the machined portion is cut off With this structure, as the residual material does not fall in the machine chamber, the machine chamber can be prevented from being damaged by the residual material.

According to another aspect of this disclosure, there is provided a method for collecting a machined portion to be cut off from a material through turning machining, the method including monitoring, during cutting machining relative to the machined portion, whether cutting-off of the machined portion is completed, and driving the holding unit, based on the result of monitoring, such that the holding unit having a pair of arms is opened such that the pair of arms stay near the circumferential surface of the machined portion with a space between the arms and the circumferential surface of the machined portion before completion of the cutting-off, and such that the holding unit is closed at the time of completion of the cutting-off such that the pair of arms is in contact with the circumferential surface of the machined portion to thereby sandwich the machined portion.

With this structure, as the holding unit stays spaced apart from the material during cutting machining, the holding unit does not apply an extra force to the material. Consequently, deflection and vibration of the material are prevented, which improves the quality of the cut section of the machined portion. Further, the machined portion is sandwiched with the holding unit upon completion of cutting machining, whereby damage to the machined portion due to drop of the machined portion can be effectively prevented.

According to the collecting mechanism and the collecting method disclosed in this specification, the quality of a machined portion to be cut off from a material in cutting machining can be further improved.

BRIEF DESCRIPTION OF DRAWINGS

Embodiment(s) of the present disclosure will be described based on the following figures, wherein.

DESCRIPTION OF EMBODIMENTS

Figure 1:
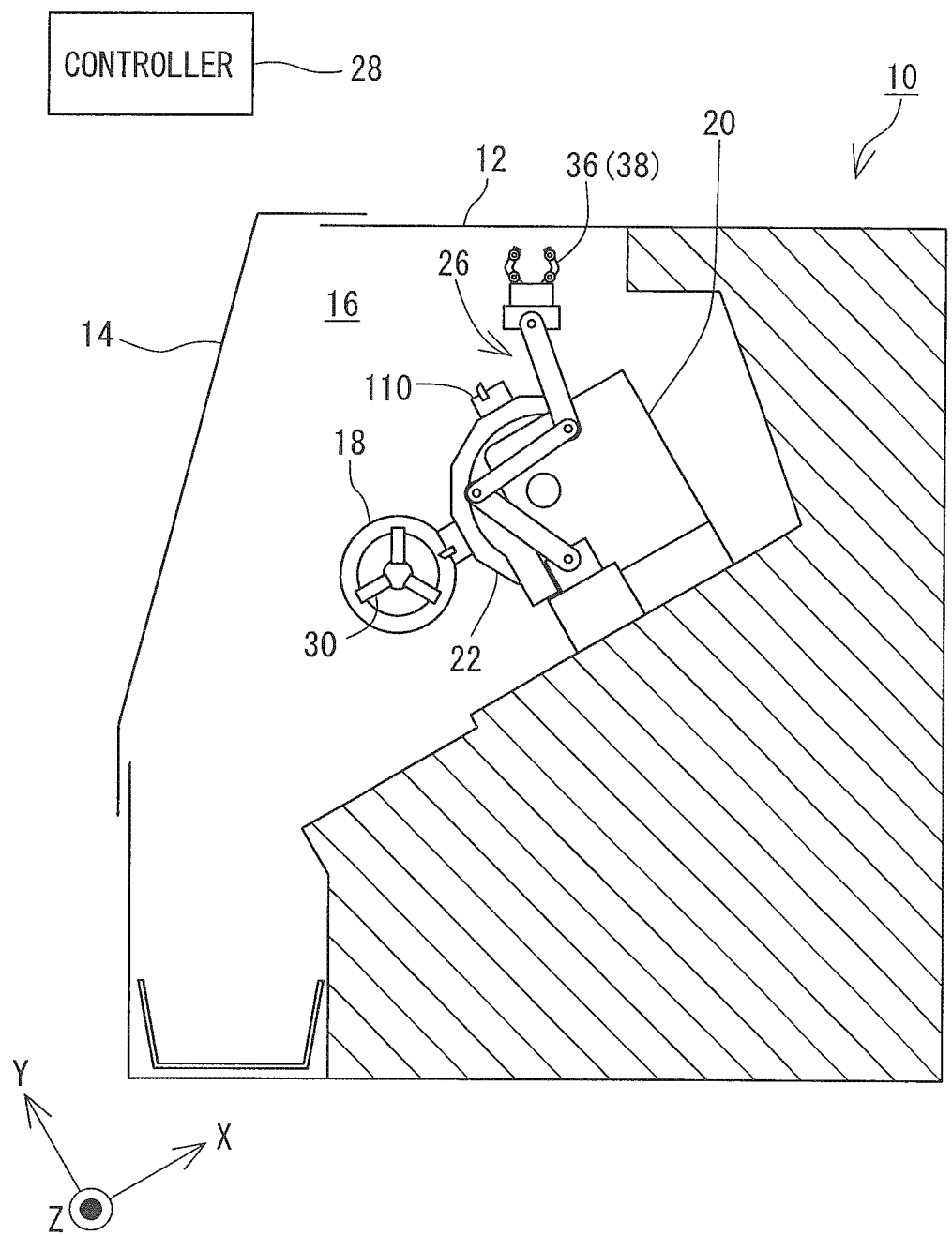
FIG. 1 is a schematic side view of a machine tool having a built-in collecting mechanism.
Figure 2:
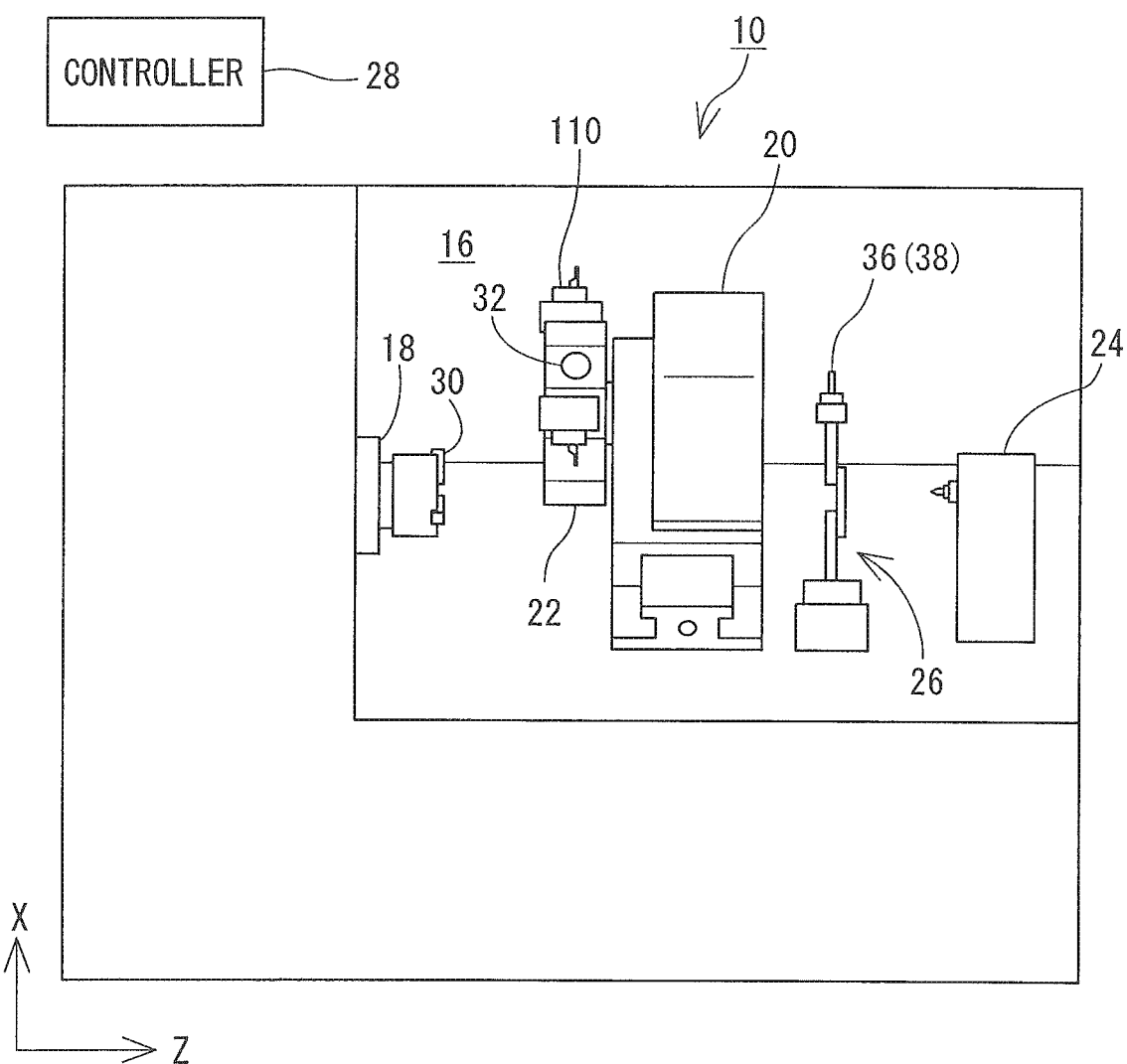
FIG. 2 is a schematic front view of the machine tool.

The structure of a collecting mechanism for collecting machined portions will now be described with reference to the drawings. FIG. 1 is a schematic side view of a machine tool 10 having a built-in collecting mechanism. FIG. 2 is a schematic front view of the machine tool 10. In the description below, a direction parallel to the rotation axis of a spindle 18 will be defined as a Z axis, a direction parallel to the movement direction orthogonal to the Z axis of a tool post 20 will be defined as an X axis, and a direction orthogonal to the X axis and the Z axis will be defined as a Y axis. As for the Z axis, the direction approaching from the spindle 18 toward the tool post 20 will be defined as a positive direction. As for the X axis, a direction approaching from the spindle 18 toward the tool post 20 will be defined as a positive direction. As for the Y axis, a direction upward from the spindle 18 will be defined as a positive direction.

This machine tool 10 is a lathe that machines a material with a tool 110 resting on the material in rotation (not illustrated in FIG. 1 and FIG. 2), the tool 110 being held by the tool post 20. More specifically, the machine tool 10 is a turning center subjected to numerical control and having a turret 22 that holds a plurality of tools 110. Turning machining using such a lathe includes cutting machining (parting machining) for cutting a material into pieces having a predetermined length. The pieces (machined portions) cut off from the material need to be collected during cutting machining. This specification discloses a collecting mechanism that collects machined portions 102 that are cut off through cutting machining.

The machine tool 10 has a machine chamber 16 whose circumferential surface is covered by a cover 12. The machine chamber 16 has a large opening on its front surface. The opening is to be closed and opened with a door 14. An operator accesses the respective units inside the machine chamber 16 through the opening. During machining, the door 14 provided to the opening is kept closed to ensure security and an appropriate environment.

The machine tool 10 includes a spindle device, the tool post 20, and a tailstock 24. The spindle device rotatably holds one end of a material. The tool post 20 holds the tool 110. The tailstock 24 supports the other end of the material. The spindle device includes a head stock (not illustrated) and the spindle 18 mounted on the head stock. The head stock has a built-in rotation motor, for example. The spindle 18 has a chuck 30 or a collet that removably holds a material so that materials to be held can be discretionally exchanged. The spindle 18 and the chuck 30 rotate around a rotation axis extending in the horizontal direction (the Z axial direction).

The tailstock 24 is disposed so as to be opposed to the spindle 18 in the Z axial direction, and supports the other end of a material held by the spindle 18. The tailstock 24 is movable in the Z axial direction so as to approach and depart from the material.

The tool post 20 holds the tool 110, for example, a turning tool referred to as a cutting tool, and functions as a holding device. The tool post 20 is movable in a direction parallel to the Z axis; that is, the axis of the material. The tool post 20 can advance and retreat also in a direction parallel to the X axis; that is, the diameter direction of the material. As is obvious from FIG. 1, the X axis is inclined upward relative to the horizontal direction as it goes farther away from the opening of the machine chamber 16 in the opposite direction of the opening. The tool post 20 has the turret 22 on its one end. The turret 22 can hold a plurality of the tools 110. The turret 22 is shaped like a polygon when viewed in the Z axial direction, and rotatable around an axis parallel to the Z axis. The turret 22 has one or more tools 110 removably mounted on the circumferential surface of the turret 22. Rotating the turret 22 enables exchange of the tools 110 to be used in machining.

The tool 110 held on the turret 22 moves in a direction parallel to the Z axis by moving the tool post 20 in the direction parallel to the Z axis and also in a direction parallel to the X axis by moving the tool post 20 in the direction parallel to the X axis. For example, an amount by which the tool 110 bites a material can be changed by moving the tool post 20 in a direction parallel to the X axis.

Inside the machine chamber 16, an inside robot 26 is installed. The inside robot 26 functions as a part of the collecting mechanism. Specifically, the inside robot 26 is a multiple-degree-of-freedom robot installed in the machine chamber 16, being a multiple-joint robot having a plurality of robot arms connected via joints. Although in this embodiment the inside robot 26 is disposed on the floor surface of the machine chamber 16, the installation position and structure of the inside robot 26 may be discretionally changeable provided that the inside robot 26 can sandwich a machined portion with a holding unit 38 to be described later. For example, the inside robot 26 can be disposed, for example, on a wall surface of the machine chamber 16 or on the spindle 18. Alternatively, the inside robot 26 can be mounted on a member, for example, the tailstock 24, that moves inside the machine chamber 16. This structure can ensure a wider area where the inside robot 26 can move.

The inside robot 26 has the holding unit 38, which is one kind of an end effector 36. The holding unit 38 is to hold a material (including a machined portion) by sandwiching the material, and has a pair of arms 40 that can be opened and closed. Although in the example illustrated only one holding unit 38 is attached to the tip end of the inside robot 26, the holding unit 38 may be attached to a different position, or two or more holding units 38 may be attached when necessary. The end effector 36 to be attached to the inside robot 26 may be exchangeable. For example, an end effector 36 (for example, sensors) other than the holding unit 38 may be attached to the inside robot 26 when collecting machined portions is not required. A specific structure of the holding unit 38 will be described later.

In response to an instruction from an operator, a controller 28 controls driving of the respective units of the machine tool 10. The controller 28 includes, for example, a CPU for various operations and a memory for storing various control programs and control parameters. The controller 28 has a communication function, and can send and receive various data, for example, NC program data, with respect to other devices. The controller 28 may include, for example, a numerical controller for arbitrarily calculating the positions of the tool 110 and the material. The controller 28 may be a single device or a combination of two or more operation devices.

The controller 28 controls the movements of the spindle 18, the tool post 20, and the tailstock 24, for example, during turning machining relative to a material, using the tool 110. The controller 28 in this embodiment functions also as a controller of the collecting mechanism for collecting machined portions, and controls driving of the inside robot 26 and the holding unit 38 when necessary. Collecting machined portions will now be described in detail.

Figure 3:
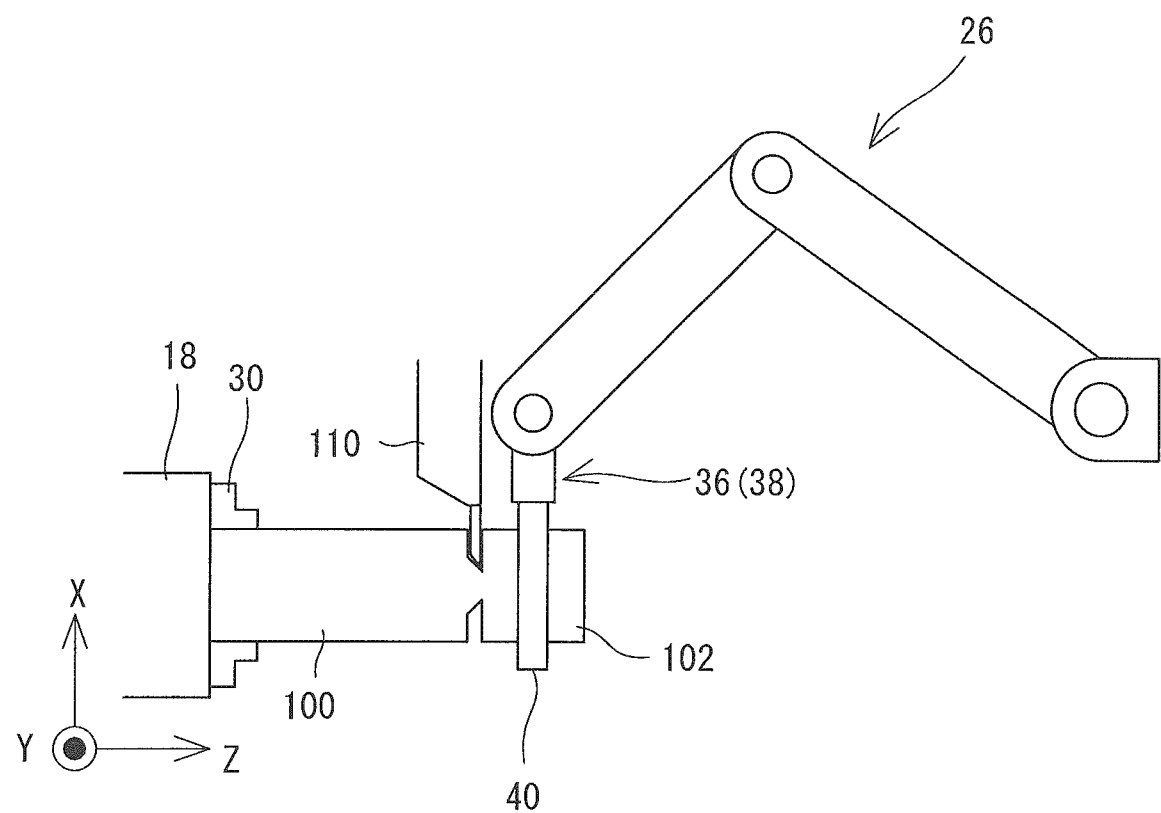
FIG. 3 illustrates a condition in which cutting machining is carried out.
Figure 4:
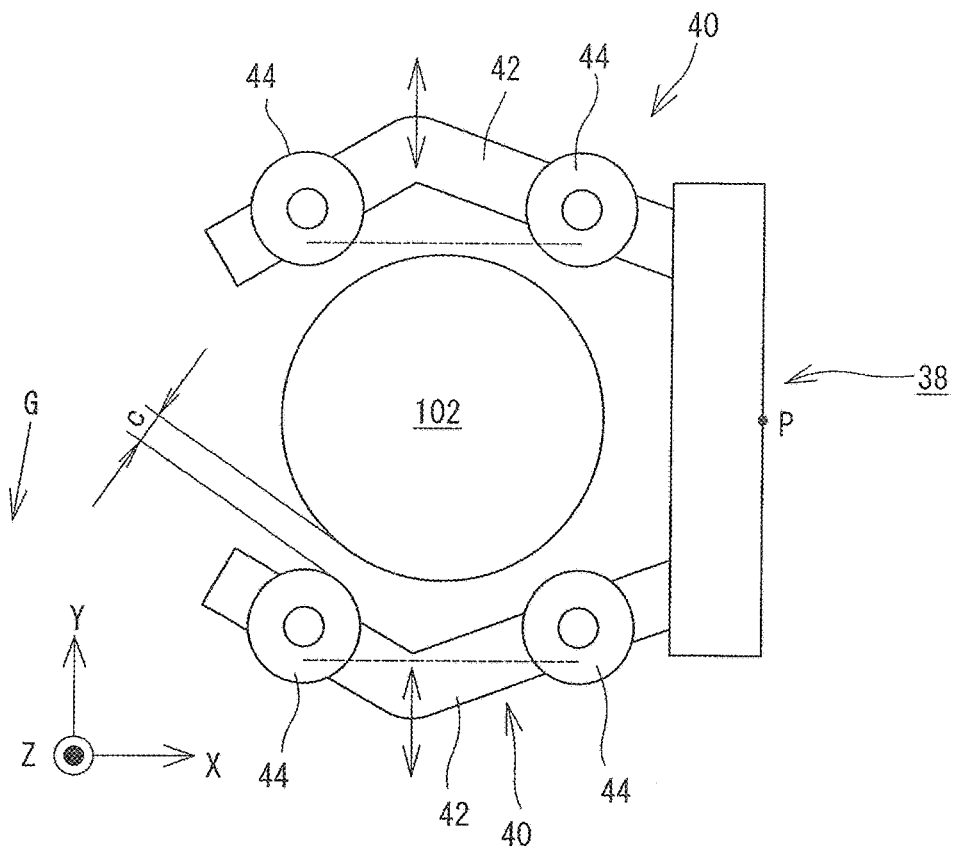
FIG. 4 illustrates a holding unit in a standby state.
Figure 5:
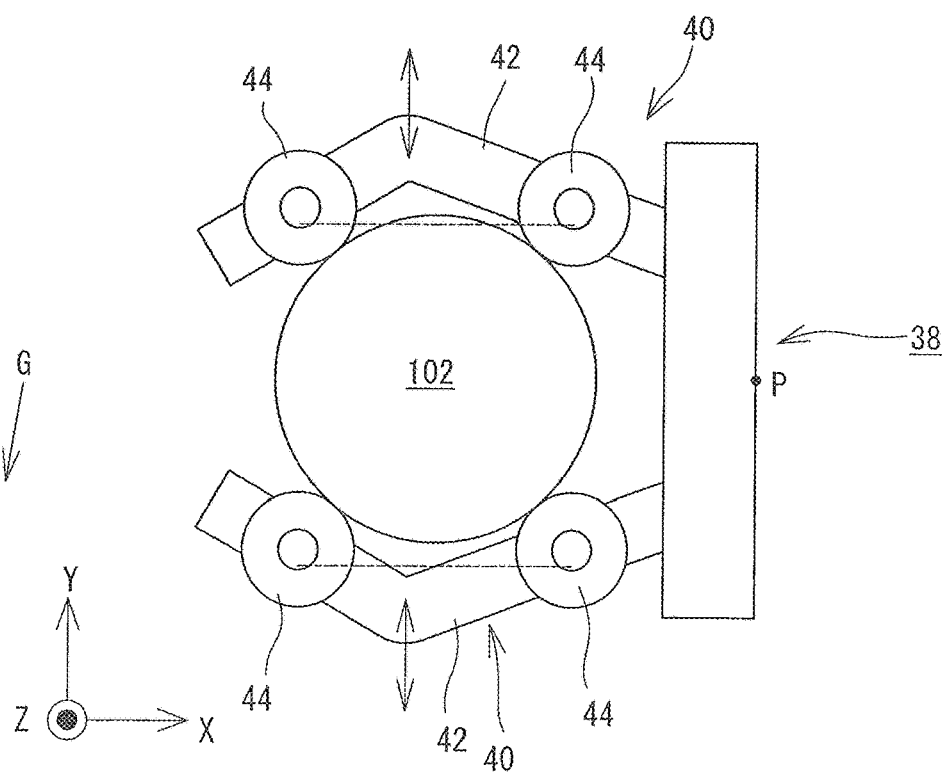
FIG. 5 illustrates a holding unit in a holding state.

FIG. 3 is a schematic diagram illustrating a condition in which parting machining is carried out. FIG. 4 and FIG. 5 illustrates the machined portion 102 and the holding unit 38 viewed in the Z direction in FIG. 3. FIG. 4 relates to a condition before a machined portion is cut off; FIG. 5 relates to a condition after a machined portion is cut off. The arrows G in FIG. 3 and FIG. 4 indicate the vertically downward direction.

As illustrated in FIG. 3, a material 100 is held with the spindle 18 via the chuck 30 during cutting machining. The spindle 18 rotates the material 100 at predetermined rotations per minute. Meanwhile, the tool post 20 advances the tool 110 for use in cutting machining in the diameter direction of the material 100, while pressing the tool 110 onto the circumferential surface of the material 100, to thereby cut the material 100 gradually. With the tool 110 finally having reached the center of the material 100, a portion of the material 100 closer to the tip end of the material 100 than the tool 110 is cut off as a machined portion 102.

In the above, if the holding unit 38 is not provided, the machined portion 102 will drop to the floor surface of the machine chamber 16 due to gravity at the same time as completion of cutting off of the machined portion 102. In some cases, the machined portion 102 can be dented or otherwise damaged due to impact in dropping or friction with other members.

To avoid such damages, traditionally, a technique has been suggested for holding the machined portion 102 by sandwiching with a pair of arms in advance so that the machines portion 102 will not drop after being cut off. According to this technique, as an arm has a bearing that tolerates the rotation of the material 100, it is possible to sandwich the machined portion 102 with a pair of arms from when the cutting machining is ongoing (that is, during a period when the machined portion 102 is still rotating). As the machined portion 102 is sandwiched with the pair of arms, the machined portion 102 will not drop after being cut off from the material 100. This can effectively prevent damage to the machined portion 102.

Note that, however, the holding unit 38 normally suffers from lower accuracy in positioning, as compared with the machine tool 10. The lower accuracy may lead to mismatch in position between the rotation center of the material 100 and the position of the holding unit 38. Hence, in some cases the material 100 can slightly deflect when being sandwiched by the holding unit 38. If the material rotates while being deflected, the material can vibrate, possibly impairing the quality of the cut section of the machined portion 102.

To address the above, in this embodiment, the holding unit 38 is opened to be in a standby state in which the arms 40 of the holding unit 38 stay close to the circumferential surface of the machined portion 102 with a space left between the arms 40 and the circumferential surface of the machined portion 102, as illustrated in FIG. 4, before the machined portion 102 is cut off; that is, when the machined portion 102 is still connected to the material 100. Then, upon completion of cutting, the holding unit 38 is closed to be in a holding state in which the arms 40 are in contact with the circumferential surface of the machined portion 102, as illustrated in FIG. 5. To close and open the holding unit 38, as described above, the controller 28 keeps monitoring whether cutting machining relative to the machined portion 102 has been completed. Upon determination of completion of cutting machining relative to the machined portion 102, the controller 28 switches the holding unit 38 from the standby state, as illustrated in FIG. 4, to the holding state, as illustrated in FIG. 5.

With this structure, as the holding unit 38 does not apply an extra force to the material 100 during cutting machining, deflection and vibration of the material 100 can be effectively prevented, which can further improve the quality of the cut section of the machined portion 102. Further, as the machined portion 102 is held by being sandwiched by the holding unit 38 at the time of completion of cutting, damage to the machined portion 102 due to dropping of the machined portion 102 can be effectively prevented.

The holding unit 38 for use in collecting such machined portions 102 will now be described in detail. As illustrated in FIG. 4 and FIG. 5, the holding unit 38 in this embodiment includes two arms 40 disposed like mirror images relative to the center line of the holding unit 38 in the width direction (the up-down direction on the paper surface with FIG. 4 and FIG. 5 printed thereon). The two arms 40 are movable in a direction in which the two arms 40 approach and depart from each other. In other words, the two arms 40 can advance and retreat in the width direction of the holding unit 38.

Figure 6:
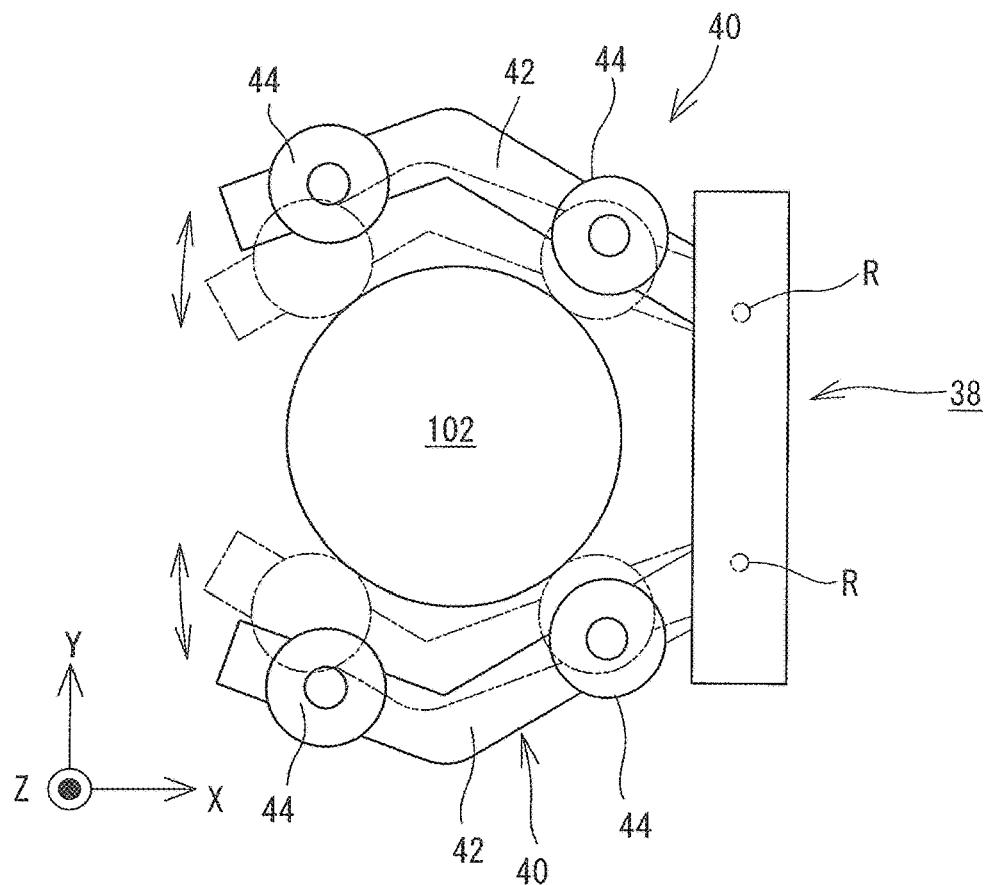
FIG. 6 illustrates one example of another holding unit.

Inside the holding unit 38, an opening/closing actuator (not illustrated) for opening and closing these two arms 40 is mounted. This opening/closing actuator may include at least one of an electric motor, a hydraulic piston, a pneumatic piston, and an electromagnetic cylinder, for example. The motion by the actuator is transmitted to the arms 40 either directly or via various transmission mechanisms. The transmission mechanisms may include, for example, a lead screw, a gear, or a cam. The motion to be transmitted to the two arms 40 may have a mirror-image relationship. In this embodiment, each arm 40 can linearly move in the width direction of the holding unit 38 as being actuated by an opening/closing actuator 48. Needless to say, however, the two arms 40 may move in any ways other than linearly. For example, as illustrated in FIG. 6, each of the two arms 40 may rock with a rotation axis R at its root as the center.

Each arm 40 includes a main arm body 42 and two rollers 44 mounted on the main arm body 42. Each of the rollers 44 is rotatable around an axis extending in the thickness direction of the holding unit 38 (a direction perpendicular to the paper surface with FIG. 4 and FIG. 5 printed thereon). In sandwiching the machined portion 102 with the holding unit 38, the holding unit 38 is disposed such that the rotation axes of the rollers 44 are parallel to the central axis of the machined portion 102. With this disposition, the machined portion 102 is sandwiched with four rollers 44 in total mounted on the two respective arms 40 as the rollers 44 protrude from the width of the main arm body 42. As the rollers 44, sandwiching the machined portion 102, are rollable on the circumferential surface of the machined portion 102, friction between the holding unit 38 and the machined portion 102 can be reduced.

In this embodiment, the two rollers 44 on one main arm body 42 are disposed linearly in the height direction (in the right-left direction on the paper surface with FIG. 4 and FIG. 5 printed thereon) of the holding unit 38. This structure is employed to simplify the calculation processing for the target position of the holding unit 38. That is, in order for the holding unit 38 to sandwich the machined portion 102, the holding unit 38 should be positioned such that the center of the circumcircle of the four rollers 44 coincides with the center of the machined portion 102. This disposition requires calculation of the center position of the circumcircle relative to a reference point P at the root of the holding unit 38 (or the tip end of the inside robot 26) if the center position of the circumcircle relative to the reference point P changes depending on the distance between the two arms 40 in the open state (thus, the diameter of the machined portion 102 to be sandwiched). This makes the calculation processing complicated. In contrast, in a structure in which two rollers 44 are linearly disposed in the height direction of the holding unit 38 and the pair of rollers 44 linearly advance and retreat in the width direction of the holding unit 38, the straight line connecting the two rollers 44 on one arm 40 is always parallel to the straight line connecting the two rollers 44 on the other arm 40. In this case, the center position of the circumcircle of the four rollers 44 relative to the reference point P remains constant even if the distance between two arms 40 in the open state (thus, the diameter of the machined portion 102) should change. Consequently, calculation of the center position of the circumcircle relative to the reference point P is unnecessary, which can simplify the calculation processing.

Note that at least a surface of the main arm body 42, the surface being opposed to the other main arm body 42, is desirably curved or bent so as to convex in a direction departing from the other main arm body 42. In this embodiment, each main arm body 42 has a substantially dogleg shape such that the opposed main arm bodies 42 are convex in mutually departing directions. This structure makes it unlikely that the main arm body 42 interferes with the machined portion 102 sandwiched with the four rollers 4, as illustrated in FIG. 5.

Here, each arm 40 on standby is disposed slightly spaced apart from the outer circumferential surface of the machined portion 102, as described above. The minimum amount c of the space between the arm 40 on standby and the outer circumferential surface of the machined portion 102 is desired to be determined in consideration of an amount by which the machined portion 102 suspends or swings during cutting machining. For example, when the machined portion 102 has a larger mass, the machined portion 102 suspends a greater distance in the gravity direction before being cut off. Further, when the rotation speed of the spindle is faster, the machined portion 102 swings to a greater extent due to centrifugal force. As the minimum amount c of the space with the arm 40 on standby is desired to be larger than the amount of suspension or swing, the minimum amount c of the space with the arms 40 on standby may be set larger with respect to a larger mass of the machined portion 102 or the faster speed of the rotation of the spindle. Moreover, the minimum amount c of the space may take a constant value or a variable value that changes as cutting machining progresses. For example, the minimum amount c of the space may become gradually smaller as cutting machining progresses.

Determination of the time of completion of cutting by the controller 28 will now be described in detail. The controller 28 monitors the state of the process of cutting off of the machined portion 102, and upon determination of completion of cutting, switches the holding unit 38 from a standby state to a holding state. Here, the cutting resistance and the rotation resistance of the spindle are known to drop sharply upon completion of cutting. From this point of view, in this embodiment at least one of the cutting resistance and the rotation resistance of the spindle is monitored during cutting machining to determine a time at which the resistance drops sharply as the time of completion of cutting.

To monitor at least one of the cutting resistance and the rotation resistance of the spindle 18, a sensor (hereinafter referred to as "a cutting determination sensor 46") that measures a physical quantity that depends on at least one of the cutting resistance and the rotation resistance of the spindle 18 is provided in this embodiment. Physical quantities that depend on the cutting resistance include, for example, the output torque and applied current of a motor that moves the tool post 20 in the X direction, or an X direction-moving motor, and the amount of deflection of the tool 110. These output torque, applied current, and amount of distortion are larger with respect to a larger cutting resistance. Meanwhile, physical quantities that depend on the rotation resistance of the spindle 18 include, for example, the output torque and applied current of the rotation motor of the spindle 18. These output torque and applied current are larger with respect to a larger rotation resistance of the spindle 18. Hence, at least one of a torque sensor for measuring the torque of the X direction-moving motor, a current sensor for measuring the applied current of the X direction-moving motor, a distortion sensor for measuring the distortion of the tool 110 (for example, piezoelectric elements), a torque sensor for measuring the output torque of the rotation motor of the spindle 18, and a current sensor for measuring the applied current of the rotation motor of the spindle 18 is provided as the cutting determination sensor 46 in this embodiment to determine completion of cutting.

Figure 7:
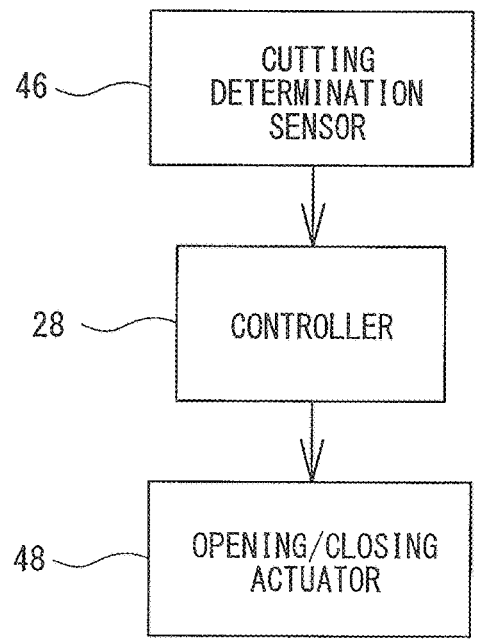
FIG. 7 is a block diagram illustrating the electric structure of units involved in determination of the time of completion of cutting.

The controller 28 determines a time at which the measured value measured by the cutting determination sensor 46 decreases sharply as the time of completion of cutting. FIG. 7 is a block diagram illustrating the electric structure of the units involved in determination of the time of completion of cutting. In FIG. 7, the cutting determination sensor 46 is a sensor that measures a physical quantity that depends on at least one of the cutting resistance and the rotation resistance of the spindle 18. The result of measurement by the cutting determination sensor 46 is inputted to the controller 28, which then determines, based on the measured value, whether cutting off the machined portion 102 has been completed. For example, the controller 28 may time-differentiate the measured value to determine that a time at which the differential value D becomes equal to a predetermined threshold $\alpha$ ($\alpha<0$) or less as the time of completion of cutting.

Note that differentiation of a measured value and comparison with the threshold $\alpha$ may be conducted in an analogue manner or a digital manner. For example, a publicly known differential circuit and comparison circuit may be serially connected between the cutting determination sensor 46 and the controller 28 so that an output value from the comparison circuit is subjected to A/D conversion before being inputted into the controller 28. Alternatively, an output value from the cutting determination sensor 46 may be subjected to A/D conversion before being inputted into the controller 28, which then digitally differentiates the inputted measured value (discrete data) before comparing with the threshold $\alpha$. In either case, a measured value of the cutting determination sensor 46 may be subjected to low-pass filtering for removal of high frequency noise before differential processing. The threshold $\alpha$ for comparison with the differential value D is a negative value, and is determined in advance in an experiment, for example. The threshold $\alpha$ may be a fixed value or a variable value that changes depending on, for example, the diameter of the material 100 to be cut.

In any case, in the case where the differential value D of the measured value becomes equal to or less than the threshold $\alpha$ that is a negative value, the controller 28 determines completion of cutting off of the machined portion 102. In this case, the controller 28 drives the opening/closing actuator 48 provided to the holding unit 38 to switch the holding unit 38 from the standby state to the holding state.

Figure 8:
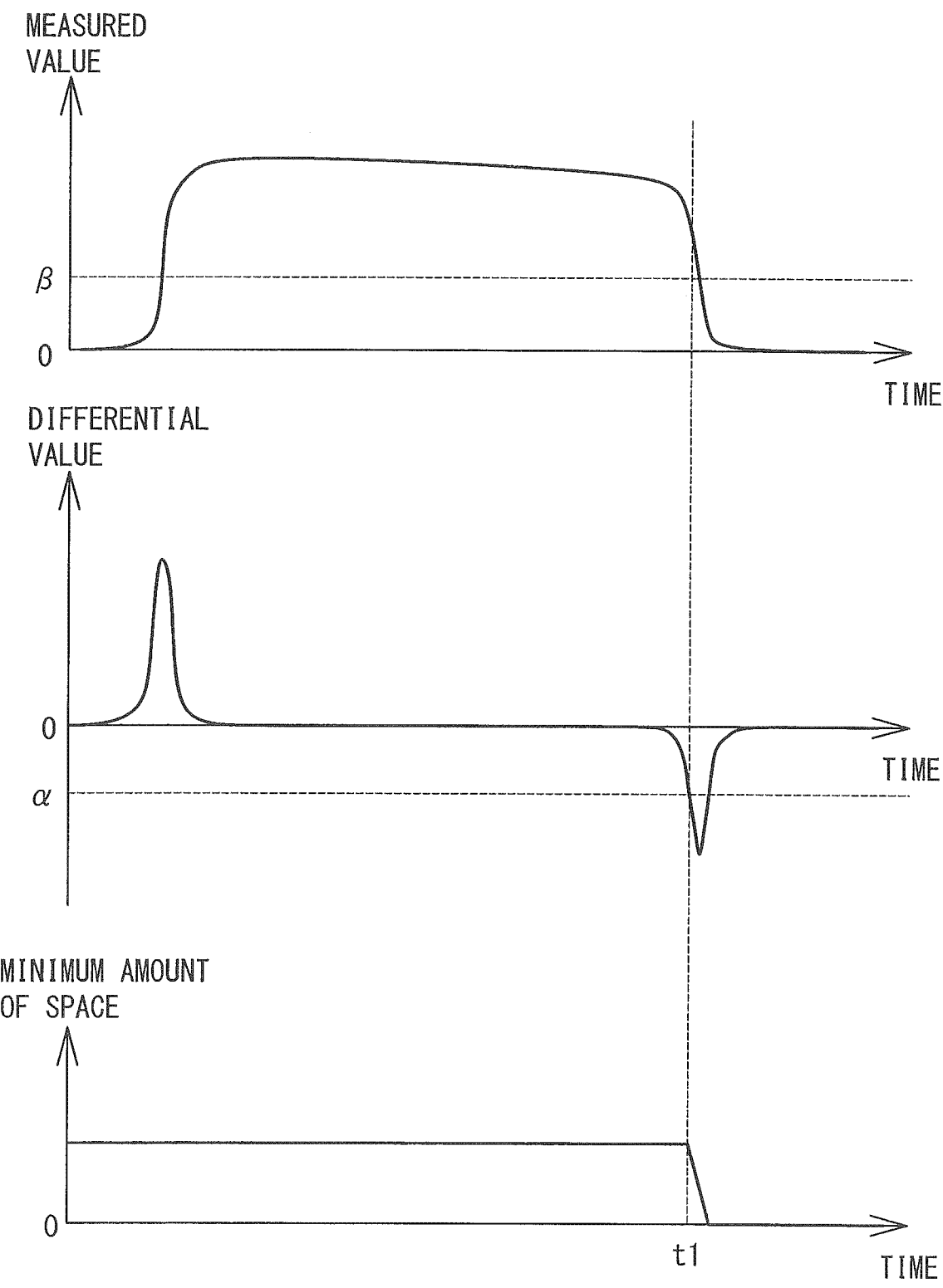
FIG. 8 is a graph showing change in a measured value of a cutting determination sensor, a differential value of the measured value, and the minimum amount c of a space.

FIG. 8 illustrates one example of change in the measured value of the cutting determination sensor 46 and the minimum amount c of the space. In FIG. 8, the top graph indicates the measured value of the current sensor (a cutting determination sensor) mounted on the X direction-moving motor for the tool post 20; the middle graph indicates the differential value D of the measured value; the bottom graph indicates the minimum amount c of the space between the arm 40 and the machined portion 102.

As illustrated in the top graph in FIG. 8, when the cutting machining begins and the tip end of the tool 110 touches the outer circumferential surface of the material 100, the cutting resistance increases sharply, followed by a sharp increase in a current to be applied to the X direction-moving motor. Once the tool 110 has bitten the material 100, the measured value of the current sensor remains substantially constant thereafter. Then, the controller 28 gradually moves the tool post 20 in the X direction, to thereby move the tip end of the tool 110 in the diameter direction. When the tip end of the tool 110 reaches the central axis of the material 100, the machined portion 102 is cut off. With the machined portion 102 cut off, the cutting resistance drops sharply, and so does the measured value of the current sensor.

Differentiated values of the measured values exhibit large peaks in the positive direction at the beginning of cutting machining and in the negative direction at completion of cutting, as illustrated in the middle graph in FIG. 8. The controller 28 determines completion of cutting at time t1, at which the differential value D becomes equal to the threshold $\alpha$ or less.

The minimum amount c of the space between the arm 40 and the machined portion 102 remains substantially constant from the beginning of cutting machining until completion of cutting. At time t1, upon determination of completion of cutting, the controller 28 switches the holding unit 38 from the standby state to the holding state. Consequently, at time t1, the minimum amount c of the space between the arm 40 and the machined portion 102 begins decreasing sharply to be zero finally, whereby the cut-off machined portion 102 is sandwiched by the holding unit 38 and thus prevented from dropping to the floor surface.

Figure 9:
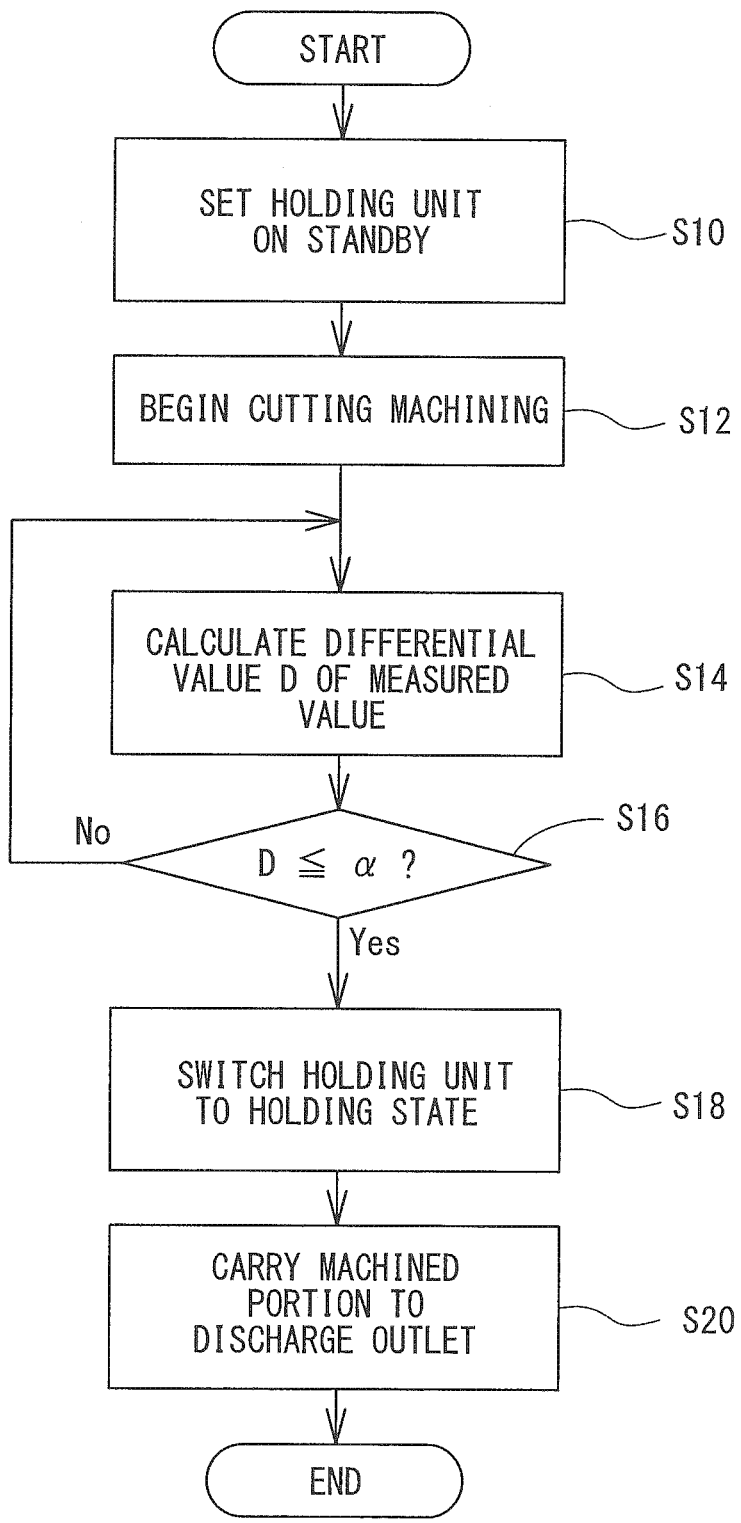
FIG. 9 is a flowchart for cutting and collecting a machined portion 102.

Referring to FIG. 9, the process of cutting and collecting such a machined portion 102 will now be described. To cut off a machined portion 102, the material 100 and the tool 110 are mounted in advance on the spindle 18 and the tool post 20, respectively, and the holding unit 38 is set on standby (S10). Specifically, the arms 40 of the holding unit 38 are kept widely open by an extent larger than the diameter of the machined portion 102, and the inside robot 26 is then driven to move the arms 40 to positions near the barycenter of the machined portion 102. In the above, the center of the circumcircle of the four rollers 44 is made to match the center of the machined portion 102. Then, the arms 40 of the holding unit 38 are closed until a predetermined space is left between the arms 40 and the circumferential surface of the machined portion 102 before being put in the standby state.

With the holding unit 38 in the standby state, the controller 28 drives the spindle 18 and the tool post 20 to begin cutting machining relative to the machined portion 102 (S12). In the above, as the pair of arms 40 stay spaced apart from the machined portion 102, the holding unit 38 does not apply an extra force to the machined portion 102. Consequently, deflection and vibration of the material 100 can be prevented, so that a preferable cut section of the machined portion 102 can be obtained.

After cutting machining begins, the controller 28 occasionally obtains a measured value of the cutting determination sensor 46 that measures a physical quantity depending on the cutting resistance or the rotation resistance of the spindle, and differentiates the measured value (S14). The controller 28 then compares the obtained differential value D with a predetermined threshold α (S16). When the result of comparison shows that the differential value D is greater than the threshold α, steps S14 to S16 are repeated. Meanwhile, when the differential value is equal to or less than the threshold α, the controller 28 determines completion of cutting, and then switches the holding unit 38 from the standby state to the holding state (S18). That is, the opening/closing actuator 48 is driven to move the pair of arms 40 such that the arms 40 get closer to each other to thereby sandwich the machined portion 102. With the above, the machined portion 102 can be effectively prevented from dropping to the floor surface, and thus from being damaged due to an impact in dropping.

Here, the machined portion 102 keeps rotating due to inertia immediately after being cut off. As the arms 40 in this embodiment have the rollers 44 that roll on the circumferential surface of the machined portion 102, inertial rotation of the machined portion 102 is not hindered, and damage to the machined portion 102 due to rubbing can be effectively prevented. With the holding unit 38 sandwiching the machined portion 102, the controller 28 drives the inside robot 26 to carry the machined portion 102 to a predetermined discharge outlet before ending the process of cutting and collecting (S20).

As is obvious from the above description, whether cutting off the machined portion 102 has been completed is monitored to keep the holding unit 38 in the standby state before completion of cutting and to switch the holding unit 38 from the standby state to the holding state at the time of completion of cutting. With the above, as the holding unit 38 does not apply an extra force to the material 100 during cutting machining, deflection and vibration of the material 100 can be effectively prevented. Consequently, the quality of the cut section of the machined portion 102 can be further improved. Further, as the machined portion 102 is sandwiched by the holding unit 38 at the time of completion of cutting machining, damage due to drop of the machined portion 102 can be effectively prevented.

Here, the material 100 remains on the spindle 18 after the machined portion 102 is cut off. The material 100, which is left after machining (hereinafter referred to as a "residual material"), as well may be collected with the inside robot 26 and the holding unit 38. That is, after the machined portion 102 is carried to a predetermined discharge outlet, the controller 28 drives the inside robot 26 to move the holding unit 38 widely open by an extent larger than the diameter of the residual material to a position near the barycenter of the residual material. Then, the controller 28 drives the opening/closing actuator 48 to sandwich the residual material at positions close to the barycenter of the residual material with the holding unit 38, and releases the chuck 30. Then, the controller 28 drives the inside robot 26 to carry the residual material to a predetermined disposal place. As described above, collecting the residual material with the inside robot 26 and the holding unit 38 enables collecting the residual material without damaging the machine tool 10.

Note that although in the above a material is assumed to be mounted or removed from ahead of the spindle 18, a material may be supplied from a bar feeder provided behind the spindle 18. In using a bar feeder, traditionally, a residual material is pushed out by a freshly supplied material so as to drop to the floor surface of the machine chamber 16 before being discharged by a chip conveyor. In this case, the residual material can damage the machine chamber 16.

To address the above, the holding unit 38 and the inside robot 26 may be used to collect a residual material also in the case of using a bar feeder. In this case, the controller 28 opens the pair of arms 40 widely by an extent larger than the diameter of the residual material and has the holding unit 38 support the residual material at a position near the barycenter of the residual material. In addition, the controller 28 releases the chuck 30. In this case, the residual material is supported at two points by the holding unit 38 and the released chuck 30, respectively. Then, the controller 28 drives the bar feeder to supply a fresh material to therewith push out the residual material. In the above, the controller 28 drives the inside robot 26 such that the holding unit 38 is synchronized with the movement of the residual material. When the rear end of the residual material finally comes out of the chuck 30, the controller 28 closes the arms 40 of the holding unit 38 to sandwich the residual material with the holding unit 38.

Alternatively, the holding unit 38 may support the residual material at a position close to the tip end of the residual material until the residual material will have moved such that its barycenter emerges out of the chuck 30, and, once the barycenter emerges out of the chuck 30, may sandwich the residual material at positions near the barycenter of the residual material. Specifically, the controller 28 moves the holding unit 38, with the pair of arms 40 widely open by an extent larger than the diameter of the residual material, to a position near the tip end of the residual material, and has the holding unit 38 support the residual material at a position near the tip end of the residual material. Then, the controller 28 releases the chuck 30, and drives the bar feeder to supply a fresh material 100 to therewith push out the residual material. Then, once the residual material has moved such that its barycenter emerges out of the chuck 30, the controller 28 closes the chuck 30 again, then moves the holding unit 38 to a position near the barycenter of the residual material, and closes the holding unit 38 to sandwich the residual material therewith. Then, the controller 28 releases the chuck 30 again, and drives the inside robot 26 to carry the residual material.

As described above, as a residual material is collected using the inside robot 26 and the holding unit 38 also when using a bar feeder, damage to the machine chamber 16 due to drop of the residual material can be prevented. Further, as the holding unit 38 sandwiches a residual material at positions near the barycenter of the residual material, it is possible to reliably collect even a long residual material.

Note that the above-described structure is one example, and can be discretionally modified. For example, the rollers 44, which are provided to each arm 40 in the above description, are omissible. That is, as the material 100 is not sandwiched by the holding unit 38 before completion of cutting, the rollers 44 are not essential. Nevertheless, as the machined portion 102 keeps rotating for a while due to inertia after being cut off from the material 100, provision of the rollers 44 is desirable to prevent rubbing between the machined portion 102 and the arms 40. In any case, whether the rollers 44 are present, the contact surface between the arm 40 and the machined portion 102 is desirably soft to such an extent that the machined portion 102 is not damaged. For example, the contact surface (for example, the outer circumferential surface of the roller 44) between the arm 40 and the machined portion 102 may be covered by an elastic material, such as rubber or sponge.

Although in the above description the time of completion of cutting is determined based on the differential value D of a measured value of the cutting determination sensor 46, the time of completion of cutting may be determined directly, based on a measured value of the cutting determination sensor 46, rather than the differential value D of the measured value. That is, for example, a time at which the measured value of the cutting determination sensor 46 becomes equal to or less than the threshold 13 (refer to FIG. 8) may be determined as the time of completion of cutting. In addition, as the cutting resistance may fluctuate largely immediately before the machined portion 102 is cut off, depending on a machining method, in some cases, the fluctuation of the cutting resistance may be detected in such a case to determine the time of detection of the fluctuation as the time of completion of cutting.

Although in the above completion of cutting is determined based on a measured value of only one cutting determination sensor 46, two or more cutting determination sensors 46 may be provided so that completion of cutting is determined based on the measured values of these cutting determination sensors 46. For example, a current sensor of the spindle rotation motor, a current sensor of the X direction-moving motor for the tool post 20, and a deflection sensor of the tool 110 are provided, and thresholds α1, α2, α3 are set for the respective sensors. Then, a time at which the respective differential values D1, D2, D3 of the measured values from these three sensors all become equal to or less than the respective thresholds α1, α2, α3; that is, at a time at which D1<=α1, D2<=α2, and D3<=α3 are held, may be determined as the time of completion of cutting. This structure makes it possible to prevent excessive determination of completion of cutting; that is, an erroneous determination of completion of cutting, that is made before actual completion of cutting. Still alternatively, a time at which any one of the differential values D1, D2, D3 of the respective measured values of the three sensors becomes equal to or less than its corresponding one of the thresholds α1, α2, α3; that is, a time at which D1<=α1, D2<=α2, or D3<=α3 is held, may be determined as the time of completion of cutting. This structure makes it possible to prevent determination failure; that is, an erroneous determination that cutting machining has not yet been completed, that is made when the cutting machining has already been completed.

Although in this embodiment completion of cutting is determined, based on at least one of the cutting resistance and the rotation resistance of the spindle, the state of cutting may be determined based on other parameters. For example, the position of the tip end of the tool 110 can be estimated based on the position of the tool post 20 in the X direction, and a time at which the tip end of the tool 110 reaches the central axis of the material 100 can be determined as the time of completion of cutting. Still alternatively, a period of time necessary for cutting machining to be completed may be estimated in advance based on the diameter of the material 100 or the feeding speed of the tool 110, and a time of completion of cutting may be determined based on the period of time elapsed after beginning of cutting machining.

Although in the above description a multiple-degree-of-freedom inside robot 26 is used as a moving device for moving the holding unit 38, any other moving mechanism can be used instead, provided that the mechanism can move the holding unit 38 at least in the Z axial direction. For example, a Z moving mechanism may be provided on the ceiling of the machine chamber 16, so that the holding unit 38 is suspended from the Z moving mechanism to be held.

REFERENCE SIGNS LIST 10 machine tool, 12 cover, 14 door, 16 machine chamber, 18 spindle, 20 tool post, 22 turret, 24 tailstock, 26 inside robot, 28 controller, 30 chuck, 36 end effector, 38 holding unit, 40 arm, 42 main arm body, 44 roller, 46 cutting determination sensor, 48 opening/closing actuator, 100 material, 102 machined portion, 110 tool.

The invention claimed is:

1. A collecting mechanism for collecting a machined portion to be cut off from an adjoining material through turning machining using a spindle, comprising:
    a holding unit having a pair of arms, the holding unit being for sandwiching the machined portion with the pair of arms, the holding unit being switchable between a holding state in which the pair of arms is closed so as to be, when in use, in contact with a circumferential surface of the machined portion to sandwich the machined portion and a standby state in which the pair of arms is open so as to surround, when in use, the circumferential surface of the machined portion, with a space between the pair of arms and the circumferential surface of the machined portion; and
    a controller for controlling driving of the holding unit,
    wherein, during a process of a tool cutting off the machined portion from the adjoining material held by a spindle,
    the controller is configured to monitor whether the cutting-off of the machined portion has been completed and to keep the holding unit in the standby state during a time period from a start of the cutting-off of the machined portion until determination of completion of the cutting-off, and to switch the holding unit from the standby state to the holding state at a time of completion of the cutting-off; and
    wherein each arm of the pair of arms includes a main arm body, and one or more rollers mounted on the main arm body, the roller being rollable on the circumferential surface of the machined portion.

2. The collecting mechanism according to claim 1, wherein
    the holding unit has an opening and closing actuator for linearly advancing and retreating the pair of arms in a width direction of the holding unit, and
    the one or more rollers comprises at least two rollers, wherein the at least two rollers of each arm of the pair of arms are linearly disposed on the main arm body in a height direction of the holding unit.

3. The collecting mechanism according to claim 2, wherein a first surface of the main arm body of a first arm, of the pair of arms, is opposed to a second surface of the main arm body of a second arm, of the pair of arms, and
    wherein the first surface is curved or bent so as to be convex in a direction departing from the main arm body of the second arm.

4. The collecting mechanism according to claim 1, further comprising a cutting determination sensor for measuring a physical quantity that depends on at least one of a rotation resistance of the spindle that rotatably holds the adjoining material and a cutting resistance in cutting the adjoining material, wherein the controller determines the time of completion of the cutting-off of the machined portion, based on the physical quantity measured by the cutting determination sensor.

5. The collecting mechanism according to claim 4, wherein the cutting determination sensor measures the physical quantity of at least one of a torque of a rotation motor of the spindle, a current of the rotation motor, a torque of a moving motor of a tool post that holds the tool, a current of the moving motor, and a distortion of the tool, and the controller determines a time at which a differential value of the at least one of the torque of the rotation motor of the spindle, the current of the rotation motor, the torque of the moving motor of the tool post that holds the tool, the current of the moving motor, and the distortion of the tool measured by the cutting determination sensor becomes equal to or less than a threshold that is a predetermined negative value as athe time of completion of the cutting-off of the machined portion.

6. The collecting mechanism according to claim 1, further comprising a multiple-degree-of-freedom robot installed inside a machine chamber, wherein the holding unit is attached as an end effector to the robot.

7. A collecting mechanism for collecting a machined portion to be cut off from an adjoining material through turning machining using a spindle, comprising;

a holding unit having a pair of arms, the holding unit being for sandwiching the machined portion with the pair of arms, the holding unit being switchable between a holding state in which the pair of arms is closed so as to be, when in use, in contact with a circumferential surface of the machined portion to sandwich the machined portion and a standby state in which the pair of arms is open so as to surround, when in use, the circumferential surface of the machined portion, with a space between the pair of arms and the circumferential surface of the machined portion; and a controller for controlling driving of the holding unit, wherein, during a process of a tool cutting off the machined portion from the adjoining material held by a spindle, the controller is configured to monitor whether the cutting-off of the machined portion has been completed and to keep the holding unit in the standby state during a time period from a start of the cutting-off of the machined portion until determination of completion of the cutting-off, and to switch the holding unit from the standby state to the holding state at a time of completion of the cutting-off, wherein the controller controls the holding unit such that the holding unit collects a residual material that is the adjoining material left behind after the machined portion is cut off from the adjoining material.

8. A method for collecting a machined portion to be cut off from an adjoining material through turning machining using a spindle, comprising:

monitoring, during cutting machining relative to the machined portion, whether cutting-off of the machined portion is completed, and driving a holding unit, based on a result of monitoring, such that the holding unit having a pair of arms is switchable between a holding state in which the pair of arms is closed so as to be in contact with a circumferential surface of the machined portion to sandwich the machined portion, and a standby state in which the pair of arms is opened such that the pair of arms surround the circumferential surface of the machined portion, while the machined portion is connected to the adjoining material that is held by the spindle, with a space between the arms and the circumferential surface of the machined portion, and controlling, by a controller, the driving of the holding unit, wherein the controller performs the monitoring and keeps the holding unit in the standby state during a time period from a start of the cutting-off of the machined portion until the controller determines completion of the cutting-off, and the controller switches the holding unit from the standby state to the holding state such that the holding unit is closed at a time of completion of the cutting-off such that the pair of arms is in contact with the circumferential surface of the machined portion to thereby sandwich the machined portion.

* * * * *